United States Patent [19]

Termet

[11] Patent Number: 4,531,322
[45] Date of Patent: Jul. 30, 1985

[54] APPARATUS WITH MULTIPLE PROPULSION CHARGES FOR SLAUGHTERING ANIMALS

[76] Inventor: Pierre Termet, 16 Impasse Belloeuf, 69391 Lyon, France

[21] Appl. No.: 499,493

[22] Filed: May 31, 1983

[30] Foreign Application Priority Data

May 28, 1982 [FR] France .................................. 82 09367
Apr. 29, 1983 [FR] France .................................. 83 07150

[51] Int. Cl.³ ............................................... A22B 3/02
[52] U.S. Cl. ........................................ 42/1 M; 42/11; 42/13; 17/1 B
[58] Field of Search ...................... 42/1 M, 10, 11, 13; 89/1 B; 17/1 B; 227/10

[56] References Cited

U.S. PATENT DOCUMENTS 3,067,454 12/1962 Catlin et al. .......................... 42/1 M
3,609,901 10/1971 Necas .................................... 42/1 M
3,755,949 9/1973 Hancox .................................. 42/1 M

FOREIGN PATENT DOCUMENTS

2426543 1/1980 France .................................. 17/1 B

Primary Examiner—Charles T. Jordan
Attorney, Agent, or Firm—Brisebois & Kruger

[57] ABSTRACT

An apparatus for stunning animals and which has multiple propulsive charges. The apparatus is of the type in which a spike or plunger is projected toward the head of an animal to be slaughtered. The barrel of the apparatus is mounted on a part pivoted to the breech for pivotal movement about an axis parallel to the axis of the barrel. This arrangement mounts the barrel for pivotal movement between a position in which the barrel can be locked to the breech for firing, and a position in which the cartridge chamber of the barrel is aligned with cartridges in the cylinder of a magazine located in a handle connected to the breech. This arrangement permits simply pivoting the barrel into alignment with the magazine to load a cartridge into the chamber, and then pivoting the barrel back to the firing position in which it can be locked to the breech.

14 Claims, 12 Drawing Figures

APPARATUS WITH MULTIPLE PROPULSION CHARGES FOR SLAUGHTERING ANIMALS

This invention relates to a new apparatus having multiple loads or charges and which is particularly useful for slaughtering animals with a spike or plunger which is propelled by the explosion of a powder charge and which penetrates into, or strikes the skull of the animal to stun the animal.

The present invention relates to an improved apparatus of this type.

The apparatus according to the invention comprises a loader of the type having a cylindrical magazine or chamber containing a large number of cartridges which can be introduced successively after each firing into the cartridge chamber after the cartridge which has been previously fired has been automatically ejected from the apparatus.

The present invention has for an object an apparatus having multiple propulsive charges, particularly for stunning animals, and is of the type in which a pin or plunger is projected in the direction of the head of the animal to eventually slaughter the animal. This apparatus is characterized by the fact that the barrel assembly is mounted in a manner to be able to pivot (after unlocking the barrel from the breech) around an axis parallel to that of the barrel, in such a manner that the cartridge chamber is positioned along the axis of the cells or chambers of the loader magazine containing the cartridges and which is located in a handle rigid with the breech of the apparatus.

The invention can equally be used as well in an apparatus for setting or fixing pins of bolts in various materials, through the intermediary of a piston driver which is then provided.

In accordance with the invention, the barrel can be displaced axially relative to a carrier piece pivotally connected to the breech and is pushed forwardly by a spring in a direction away from the breech so that one is able to pivot the barrel relative to the breech after unlocking the barrel from the breech. This spring serves also as a brake or restraint to avoid accidental unlocking of the barrel from the breech.

According to one preferred embodiment of the invention, a clutch dog connects the barrel and the carrier piece against relative rotation after unlocking the barrel from the breech, so that the barrel and carrier can be pivoted by acting directly on the barrel.

Conforming to one preferred embodiment of the invention, the cylinder or magazine containing the cartridges is rigidly held in the handle of the breech by an envelope made preferably of a molded plastic material having two dovetail ribs engaging in corresponding dovetail openings made on the handle, the loader envelope being maintained on the breech by a screw extending in a direction perpendicular to the axis of the barrel.

In one preferred embodiment of the invention, the pivotal axis of the barrel relative to the breech takes the form of a pin having a head which is opposed to a shoulder of the carrier connected to the barrel and which engages in a bore formed in the breech, the body of the pin having a rectangular recess or groove of rectangular section, the interior of which is engaged, perpendicularly to the axis of the pin, by a locking key fixed to the breech.

This pivot arrangement has the characteristics of great strength which does not permit it to deteriorate in the course of long use despite repeated shock during operation of the apparatus.

According to a preferred embodiment of the invention, the bushing which is situated at the front end of the barrel and which supports the parts which in turn assure the retention of the apparatus of the plunger driven by the charge, is provided with a retainer to prevent unthreading, constituted by a block of plastic material forced firmly against the threads formed on the barrel.

Conforming to a particular embodiment of the invention, at least one gas escape vent is provided in the bushing in a manner to evacuate directly to the outside, the pressures and other wastes caused by firing so they do not pass through the threads of the bushing, which permits always easy removal of the bushing.

In this apparatus which will soon be described, each time after firing, the cartridge chamber is placed in a loading position, and a cartridge contained in a loading pocket automatically enters the cartridge chamber by gravity.

This is particularly the case when coming to the last firing of a series, for example, at the end of a day's use. The apparatus is then put away with a cartridge in the chamber, which is not always satisfactory.

The invention also relates to a variation in which the apparatus comprises means located, in the position of the unlocking of the barrel, between the cartridge chamber and the corresponding pocket, this means being movable between a closed position where it prevents the passage of the cartridge from the pocket to the chamber, and an open position where it permits the passage of the cartridge.

In addition, in this variation, the loading of the apparatus does not occur automatically by gravity, but by maneuvering the movable means.

This means can be, for example, mounted for rotation around an axis fixed to the breech of the apparatus and can comprise a loading lever capable of being displaced to the closed position, and open position, and elastic return means to return the lever to the closed position.

The elastic means can then comprise a spring whose one end is supported on the breech of the apparatus and whose other end is supported on the loading lever.

In one particular embodiment of the invention the loading means comprises an apertured plate of rigid material.

To make the invention well understood, there will be described as examples, without limiting the scope of the invention, two embodiments which are shown on the accompanying drawings.

DETAILED DESCRIPTION

The drawings show a slaughter gun or fastener driver according to the invention. There is a barrel 1 which contains a plunger 2 shown to be of the type which can penetrate the skull of an animal to slaughter the animal. The plunger 2 is driven by gas generated by the firing of cartridge 3, which acts on the rear face of piston 4 that slides along the interior of barrel 1.

In a known manner, a stack of annular rubber elements 5 and a helical spring 6 brake or decelerate the plunger 2 as it moves toward a plunger retention bushing 7 at the end of the barrel and which is provided with an opening through which plunger 2 passes when the gun or apparatus is fired. The barrel has at least one gas vent opening 36 located to permit rapid escape of the high pressure explosion gas, to provide for rapid return of the plunger into the apparatus to the position shown at FIG. 1.

Figures 2, 4, 5:
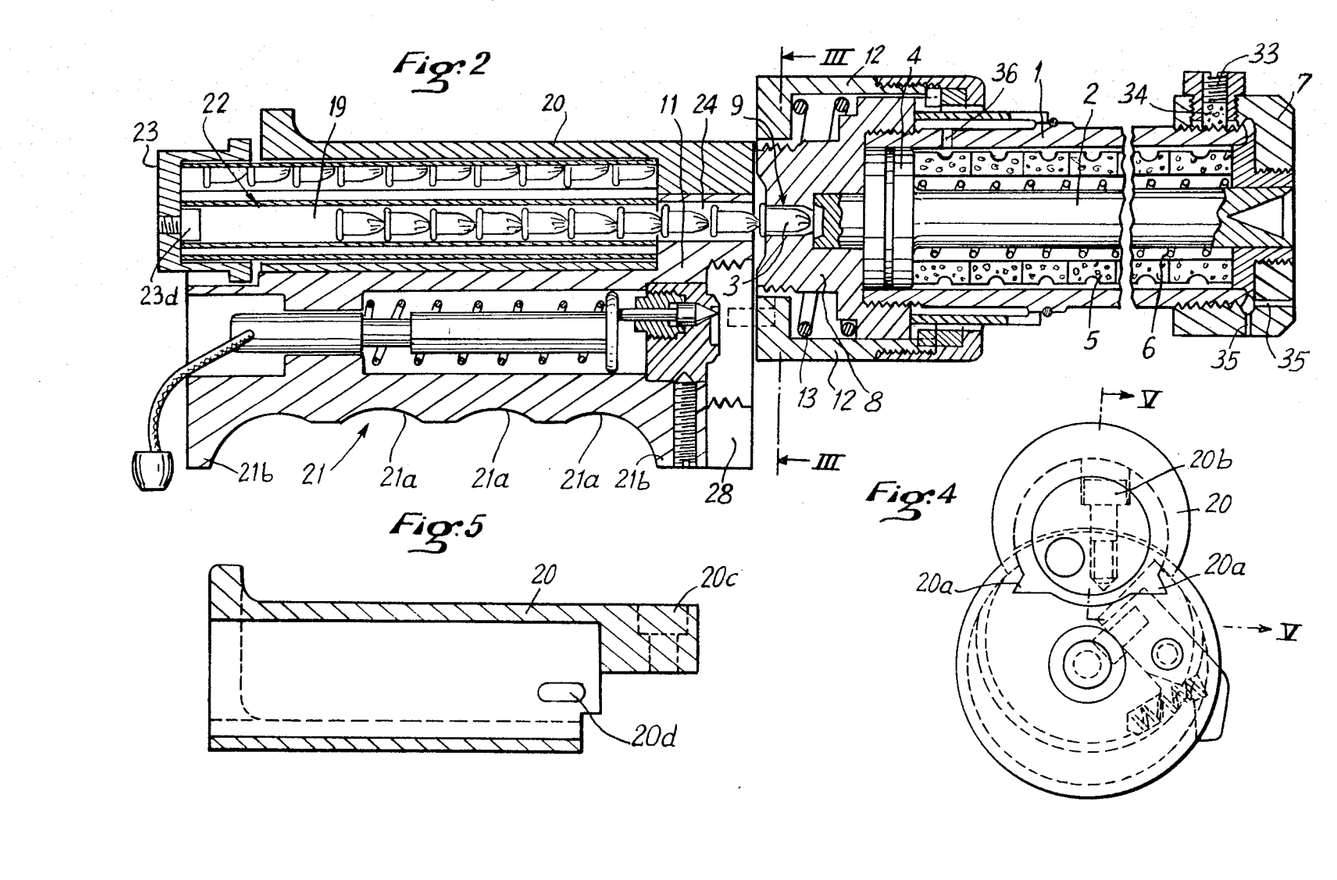
FIG. 2 is a view in section along II—II of FIG. 3, which corresponds generally to FIG. 1 but shows the apparatus after pivoting the barrel relative to the breech, to its loading position.
FIG. 4 is a rear view of the apparatus as shown in FIG. 2.
FIG. 5 is a view in section of the magazine taken along V—V of FIG. 4.

The barrel 1 is threaded onto a receiver piece 8 the interior of which is machined to provide the cartridge holding and firing chamber 9 (FIG. 2). This receiver piece 8 has a quick action thread 10 to permit quickly locking the barrel 1 to the breech 11.

After being unlocked from the breech 11 (FIG. 1), the receiver piece 8 is retained in a cylindrical barrel carrier envelope 12 in the interior of which the barrel 1 and the receiver 8 can move axially, and which are moved toward the front (away from breech 11) under the action of a helical compression spring 13. When the receiver piece 8 is threaded into the breech to lock the receiver to the breech, the spring 13 exerts a continuous force on the quick-acting thread which assures the retention of the thread in the breech to avoid inadvertent unlocking in spite of play or clearance which may be present in the threads.

In accordance with the invention, the barrel carrier 12 is connected to the breech 11 by a pivotal connection comprised of a pin or shaft 14 having a head 15 and which extends through an opening in carrier envelope 12 and into a corresponding opening of the breech 11.

Figure 1:
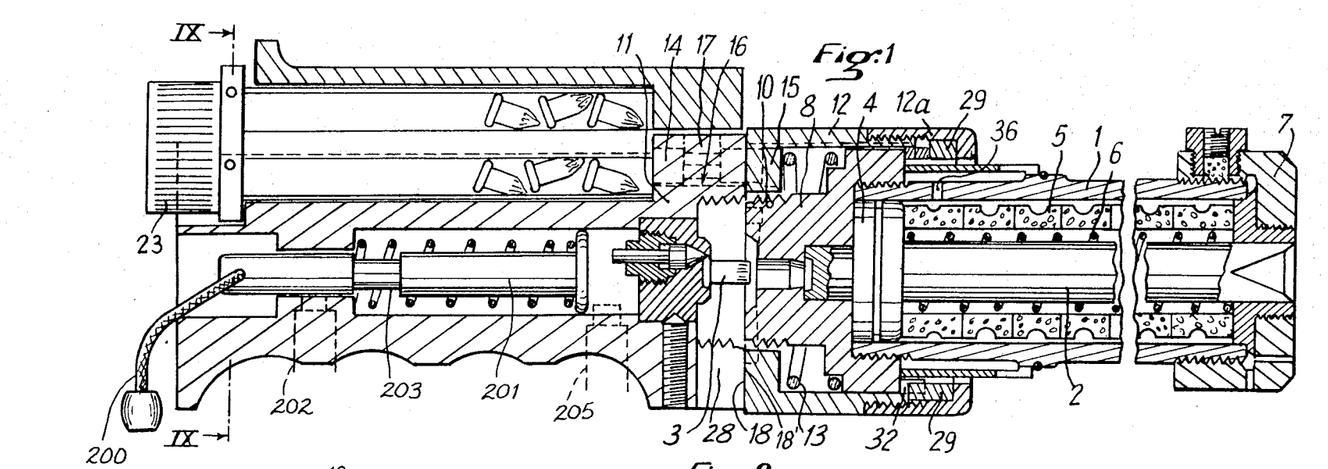
FIG. 1 is a view in longitudinal section of an apparatus according to the invention in the position in which the barrel is unlocked from the breech but is not pivoted relative to the breech.

The pin 15 has a groove 16 of rectangular section between its ends which is engaged by a key 17 in the breech 11, which is fastened by two screws (not shown at FIG. 1) which are situated in front of and to the rear of the plane of FIG. 1.

As is evident, this provides a robust pivot axle or shaft which permits pivoting the barrel transversely, after unlocking or unthreading the receiver piece 8 from the breech.

This pivot mechanism is relatively immune to vibrations which are produced during firing, since the carrier envelope 12 is maintained by the head 15 of the pin which is in turn securely anchored in the body of the breech by the key 17.

FIG. 1 shows the apparatus in a position corresponding to the end of unlocking or unthreading of the barrel assembly from the breech. As previously explained, because of the construction of the receiver piece 8 and the envelope 12, the barrel can be shifted or displaced sufficiently towards the front (away from the breech) so that the rear surface of the receiver piece 8 is in front of the planar front surface 18′ of the breech.

As a result, the barrel and carrier envelope 12 can then be pivoted relative to breech 11 around the pin or shaft 14.

Figure 9:
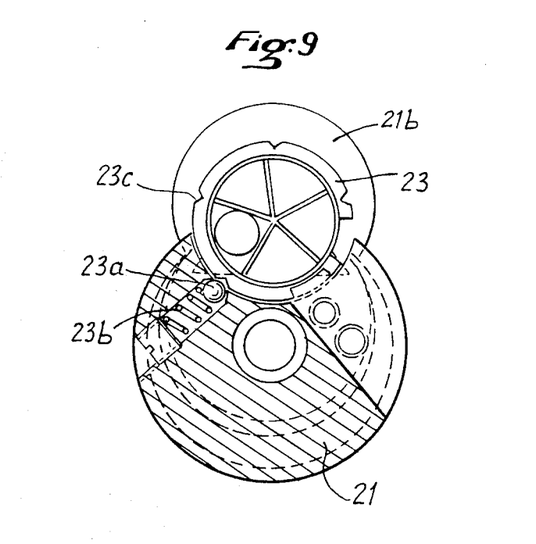
FIG. 9 is a view in section taken along IX—IX of FIG. 1.

As shown at FIG. 2, because of this pivotal movement, the axis of barrel 1 and the cartridge chamber 9 can pivot to a position in alignment with the axis of a row of cartridges in a cell 19 of a magazine or loader 22. This magazine 22 is retained in a plastic material housing 20 which is securely fixed to the handle 21. The magazine 22 comprises a number of cells such as 19 (there are five such cells in the embodiment shown) which by rotation with the assistance of a control knob 23 can be aligned successively with the axis of the opening 24 which is aligned with the axis of cartridge chamber 9 when the barrel is pivoted to the position of FIG. 2. As shown at FIG. 9, a ball 23a urged by a spring 23b can seat in the several notches 23c formed on a collar of the head of control knob 23 to position the magazine in each of the five operating positions. The control knob 23 is fixed to the magazine by the head of a screw 23d by virtue of its engagement in a cell or chamber 19.

Figure 3:
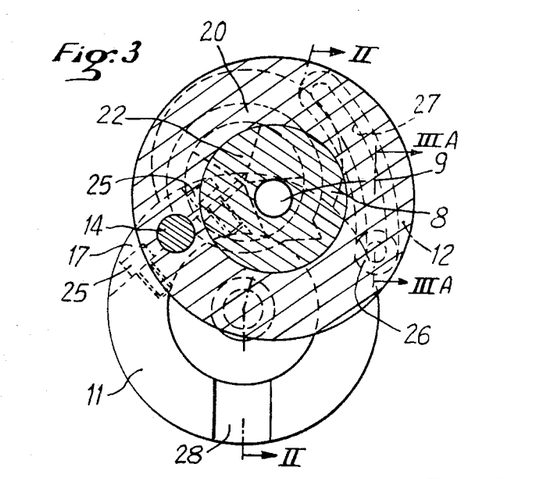
FIG. 3 is a view in section along III—III of FIG. 2.
Figure 3A:
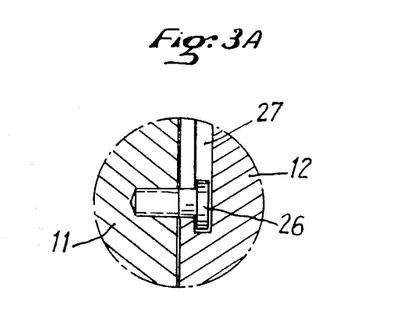
FIG. 3a is a partial view in section along IIIA—IIIA of FIG. 3.

FIG. 3 shows the shaft or pin 14 which constitutes the pivot axle of barrel 1 relative to breech 11, and the key 17 retained by the two screws 25 on opposite sides of groove 16 of the pin or shaft 14.

In the embodiment shown, the groove 16 has a rectangular section so that the lateral sides constitute effective supports on the key 17.

FIG. 3 also shows the magazine 22 with its five cells one of which is aligned with the cartridge chamber 9.

A gudgeon screw 26 having its head at the inside of a groove 27 of arcuate curvature limits the pivotal movement of the barrel relative to the breech, between the locking position and the position in which the axis of the barrel is aligned with the axis of a cell of the magazine or loader.

In accordance with one preferred embodiment, the groove 27 has a T-shaped section which provides support on the head of gudgeon screw 26 in a manner to avoid any tendency for the face 18 of the carrier envelope to separate from the breech 11 even if the support face of the head of the pin or shaft 14 becomes worn, and even in spite of the inertia of the different parts during firing.

FIG. 3 clearly shows that when the magazine 22 is rotated to the five different positions, the respective cells will each align with the axis of the barrel.

The operation of the apparatus according to the invention will now be described. After a cartridge is fired, one proceeds to unlock the barrel by imposing an unthreading couple on the barrel relative to the breech which has the effect of moving the parts to the position of FIG. 1, the case of the fired cartridge 3 being retained in the breech 11 in a known manner.

The pivoting of the barrel 1 and its carrier envelope 11 around the pin or shaft 14 initially has the effect of striking the case 3 of the previously fired cartridge to permit the so-dislodged case to fall through or be removed through the opening 28 formed in the breech 11, and which is clearly shown at FIGS. 1 and 3.

When the barrel 1 and the carrier envelope 12 have been pivoted to the position shown at FIG. 2, it is sufficient to merely position the apparatus so that the barrel points downwardly, for a fresh cartridge 3 to move by gravity into the cartridge chamber 9.

The barrel 1 is then pivoted back relative to breech 11 to the position of FIG. 1. The cartridge 3 which is engaged in the cartridge chamber as well as the cartridges remaining in the cell 19 of the magazine are maintained in position by the fact that the faces of the breech 11 and the carrier 12 remain in closely opposed relation during the pivoting. After pivoting to the position of FIG. 1 it is sufficient to lock the barrel in the breech to proceed to the next firing. This is easily done by pushing the barrel inwardly against the action of spring 13 and rotating the barrel clockwise as viewed from its free end.

When all the cartridges contained in the cell 19 have been used, this can be easily verified because of the window 20d provided for this reason in the wall of the envelope 20 (FIG. 5). Then, the magazine 25 can be rotated to a next one of the positions to align with the opening 24 a new cell filled with cartridges.

It is of course to be understood that the assembly composed of the barrel 1 and the receiver piece 8 is freely rotatable relative to the envelope 12 to permit the necessary rotation for locking and unlocking the barrel relative to the breech, when the barrel is pushed inwardly to the position shown at FIG. 1.

Were it not for a unique arrangement of the apparatus of this invention, one wishing to pivot the envelope 12 relative to the breech, from the position of FIG. 1, by rotating the barrel, would simply cause rotation of the barrel relative to the envelope and not pivoting of the envelope 12 relative to the breech. However, in accordance with the preferred embodiment of the invention, this inconvenience is avoided by a clutch dog arrangement which automatically locks the carrier envelope to the barrel when the barrel is unthreaded or unlocked from the breech 11.

Figure 8:
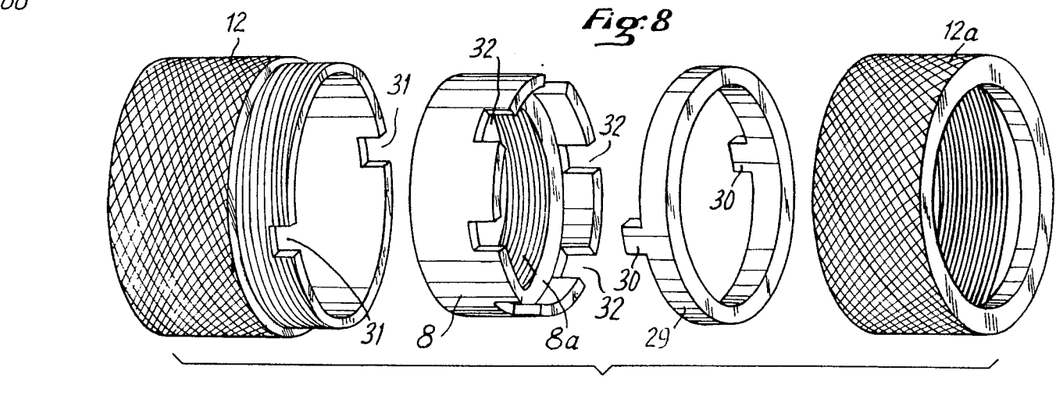
FIG. 8 is an exploded view in perspective of some of the parts of an embodiment of the dog clutch.

For this result, there is found at the front of the carrier envelope 12 in the interior of which the receiver piece 8 slides, (the rear portion of the receiver piece is not shown at FIG. 8) which is provided with a female thread 8a to be threaded onto the end of the barrel.

A cap 12a covers the forward end of envelope 12 and maintains the clutch 29 properly positioned axially. The clutch 29 is constituted by an annular piece of greater thickness than the end of envelope 12 and has two lugs 30 which engage in corresponding grooves of the envelope 12.

The lugs 30 are of a sufficient thickness to project inwardly of the envelope 12. The receiver piece 8 which supports the barrel is provided at its periphery with a series of groves 32 whose dimensions are sufficient to receive the lugs 30.

The result is that when the barrel is unlocked or unthreaded, it is pushed toward the front or right (FIG. 1) by the operator, which is assisted in this action by the action of the spring 13, and if the grooves 32 of the carrier piece 8 are not directly engaged by the lugs 30 of the piece 29, such engagement occurs automatically as a result of rotation of the barrel.

One understands that when the lugs 30 are engaged in the grooves 32 of the receiver piece 8 fixed to the barrel 1, the barrel becomes fixed rotationally with the envelope 12 and the movement of rotation exerted on the barrel causes pivoting around the pin 14 of the carrier envelope 12 relative to the breech 11.

Figure 6:
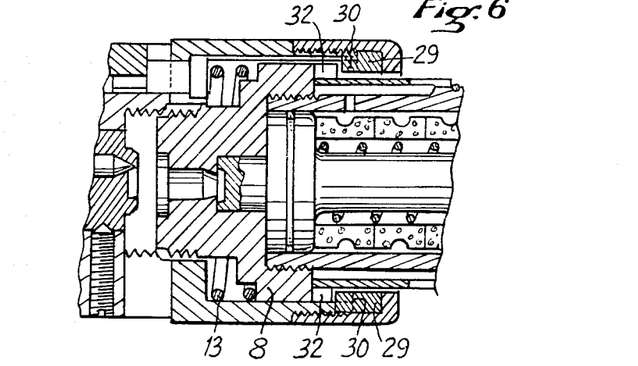
FIG. 6 is a partial view corresponding to FIG. 1 showing the barrel unlocked but in a position in which the dog clutch is not yet engaged with the barrel carrier.

FIG. 6 shows the apparatus in the position in which the barrel is unlocked but in which it has not yet completed its movement toward the right. One can clearly see from FIG. 8, the grooves 32 of the receiver piece 8 at the time just before they are engaged by the lugs 30 of the dog clutch 29.

Figure 7:
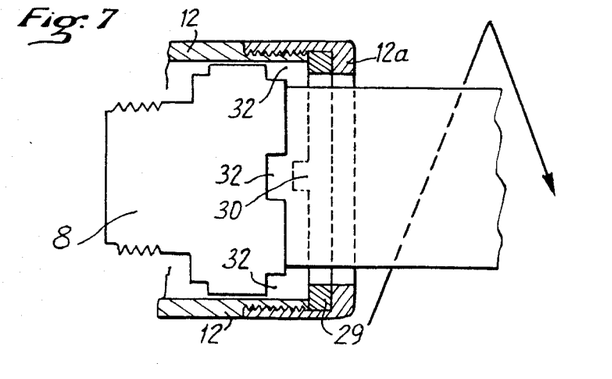
FIG. 7 is a schematic view showing how the dog clutch permits pivoting the barrel relative to the breech by torsion applied to the barrel.

FIG. 7 shows the different parts of the clutch and cap somewhat schematically. It can be seen particularly in FIG. 7, that the cap 12a of carrier envelope 12 clamps the dog clutch element 27 which has a wall thickness greater than the end of the part 12. As a result of this dimensioning and arrangement, the lugs 30 project inwardly of the inside surface of the part 12.

FIG. 7 also shows the grooves 32 at the front of the receiver piece 8. As clearly shown, the circumferential width of groove 32 is somewhat larger than the corresponding dimension of lug 30, which facilitates engagement of these two pieces when the barrel is rotated and moves in the direction of the arrow shown at FIG. 7.

In accordance with an embodiment of the invention, the loader magazine or cylinder 22 is contained in a plastic material housing 20 the profile of which is seen at FIGS. 4 and 5. This holder 20 has two dovetail ribs 20a which engage in two corresponding dovetail slots formed in the part which constitutes both the handle 21 and the breech 11 of the apparatus.

The part 20 is held against longitudinal movement by a screw 20b which extends through an opening 20c in part 20, perpendicular to the axis of the barrel, and which is threaded into a correspondingly threaded opening formed in the breech piece 11.

The part 20 is preferably molded from plastic material.

Tests conducted by the Applicant show that the embodiment of the part 20 which contains the loader magazine, and the manner in which the part 20 is fixed to the handle provides the apparatus with excellent resistance to repeated shocks which occur during firing of the apparatus. One therefore obtains an excellent mounting for the loader magazine in the handle, which facilitates gripping and manipulation of the apparatus in operation, with one hand.

By virtue of this arrangement, there is attained a handle whose form corresponds well to the anatomy of all users and which has transverse support surfaces 21b as well as recesses 21a for receiving the fingers of the user.

In accordance with another characteristic of the invention, the locking of the bushing 7 situated at the outer end of the barrel is effected with the assistance of a screw 33 disposed in a bore radial relative to the axis of the barrel and which exerts pressure on a plastic material piece 34 which is thus deformed into the thread at the end of the barrel and fixes the bushing 7 against unthreading. For disassembly, however, it is sufficient to slightly unthread the screw 33 to release the bushing 7 for removal by unthreading.

In accordance with the invention, plural vents 35 are provided in the wall of bushing 7 to vent the portion of the barrel in front of the piston 4. These vents 35 permit discharge of waste and residue which result from successive firing and enter the interior of the barrel. These wastes then do not have the tendency to lodge in the threads of the bushing 7 which can cause their locking.

Figure 10:
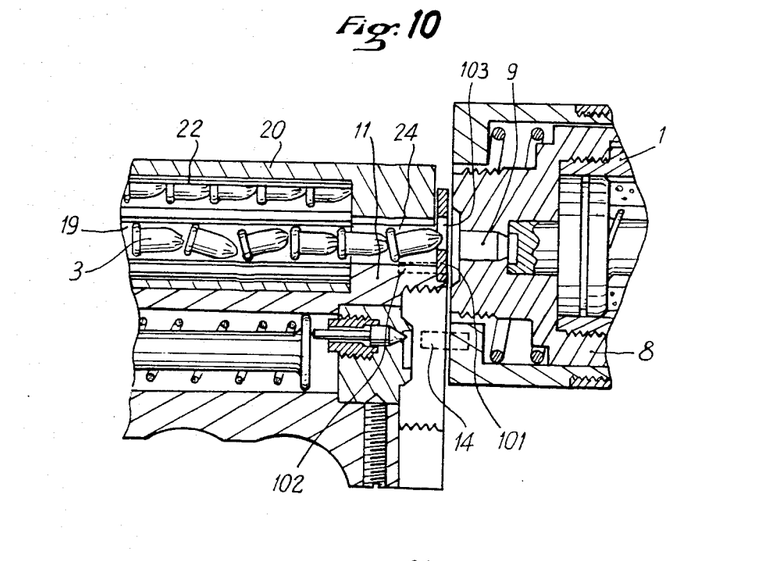
FIG. 10 is a partial view in longitudinal section similar to FIG. 2 but showing a variation of the loading arrangement of the invention.
Figure 11:
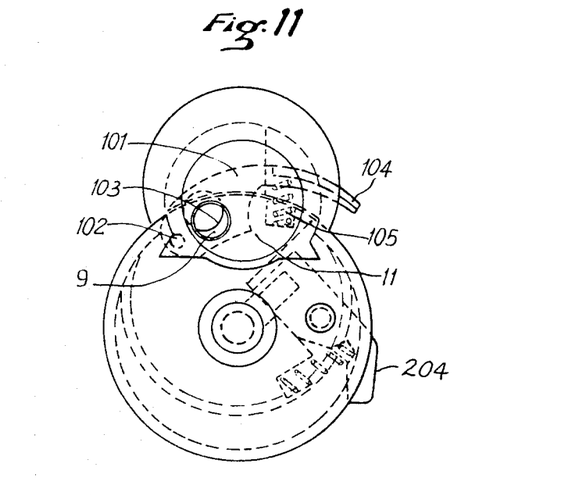
FIG. 11 is a rear view of the embodiment of FIG. 10 showing additional portions of the loading arrangement of the invention.

The apparatus shown at FIGS. 10 and 11, comprises a barrel 1, threaded on a receiver piece 8 joined to the breech 11 by a pin 14 permitting relative pivotal movement.

The breech 11 supports the part 20 in which is inserted the loader magazine 22 having the cells 19 in which cartridges 3 are placed. In the previous embodiments, when the receiver piece 8 and the breech 11 are unlocked and in the loading position, the cartridge chamber 9 forms an extension of the opening 24, which is permanently aligned with a cell 19.

According to the variation of FIGS. 10 and 11, there is provided between the chamber 9 and the loading opening 24, a safety plate 101 mounted for rotation on the breech 11 by an axle 102. The safety plate is provided with an opening 103. In the position shown at FIGS. 10 and 11, the opening 103 is not aligned with the entrance to the cartridge chamber so that the safety plate 101 prevents the passage of the cartridges 3 into the cartridge chamber. One can, however, by pivoting the plate 101 around the axle 102, move the opening 103 into alignment with the entrance of the cartridge chamber 9 so that the cartridge can then enter the cartridge chamber.

A loading lever 104 rigid with the plate 101 provides for pivoting this plate to the loading position. A spring 105 one end of which seats in the breech and the other end of which seats on lever 104 normally maintains the safety plate 101 in the position in which the transfer or loading of the cartridges into the chamber is prevented.

The arrangement of this variation as shown at FIGS. 10 and 11 operates in the following manner. When the barrel has been unlocked as previously described, the cartridge chamber 9 is brought into a position of alignment with the cartridge feed opening 24. During this movement of unlocking, the previously fired cartridge was retained in the breech, so that the cartridge chamber 9 is empty, and the previously fired cartridge was dislodged from the breech when the barrel and its carrier were pivoted to the aligned position with the loading opening 24.

The safety plate 101, being maintained in the misaligned position shown in FIGS. 10 and 11, by the action of spring 105, prevents the end cartridge in opening 24 from entering the cartridge chamber 9 regardless of the orientation of the apparatus relative to the vertical, which solves the problem of unwanted loading referred to above.

To cause loading of the apparatus, the lever 104 is pressed while the barrel is pointed downwardly toward the floor. The opening 103 of plate 101 is then brought into correspondence with the cartridge chamber 9 in such a manner that the cartridge in loading opening 24 can enter this cartridge chamber. The lever 104 being released, the plate 101 returns to the safety position under the action of spring 105, and the barrel 1 can again be pivoted and locked to the breech 11.

It is believed evident from FIGS. 1 and 4 that a cartridge in chamber 9 can readily be fired by the apparatus when the barrel is locked to the breech. This is accomplished first pulling cord 200 until hammer 201 is cocked and held by sear pin 202 engaging in groove 203. Hammer 201 is released by pushing trigger 204 which pivots sear pin 202 out of groove 203. The hammer striking the firing pin causes the cartridge to fire. A second pin 205 between the hammer and the firing pin acts as a safety device to space the hammer from the firing pin when the hammer is uncocked, and prevents the hammer from striking the firing pin if, for example, the gun is dropped. The safety pin 205 can be released by pushing the trigger 204.

It is to be understood that the embodiments which have been described above are not presented as limiting characteristics and that numerous modifications can be made without departing from the scope or spirit of the invention.

I claim:

1. Apparatus having multiple propulsion charges and of the type in which a plunger is driven when the apparatus is fired comprising, a breech, a barrel having a cartridge chamber, a magazine connected to the breech for feeding cartridges into the cartridge chamber, means for locking the barrel to the breech for firing a cartridge in the chamber, means mounting said barrel on said breech for pivotal movement about a pivot axis parallel to and spaced from the axis of the barrel, from a first position in which the barrel is aligned with and can be locked to the breech, to a second position in which the barrel is aligned with the magazine to load a cartridge into the cartridge chamber, and wherein said barrel comprises, a threaded outer end, a bushing threaded on said end, a set screw threaded into the bushing perpendicular to the axis of the barrel, and a plastic insert between the set screw and the barrel threads, said plastic insert being deformed into the barrel threads to prevent unthreading of the bushing.

2. Apparatus according to claim 1 further comprising a handle fixed to said breech, a magazine housing connected to said handle by a dovetail connection, fastener means to prevent separation of the dovetail connection, said magazine housing having an opening to receive said magazine therein.

3. Apparatus according to claim 2 wherein said handle comprises projections and recesses to accomodate the fingers of a person grasping the handle.

4. Apparatus according to claim 1 wherein said magazine comprises a plurality of circumferentially spaced chambers each for receiving a plurality of cartridges, and detent means for maintaining said magazine in a rotational position to which it is set manually and in which a magazine chamber is aligned with the barrel in its second position.

5. Apparatus according to claim 4 wherein said detent means comprises a knob on said magazine, a screw in a magazine chamber for connecting the knob to the magazine, and a plurality of indexing grooves on said knob and cooperating with a spring loaded ball carried by the breech for retaining the magazine in a preset rotary position.

6. Apparatus according to claim 1 wherein said bushing comprises vent means for discharging wastes entering said barrel during firing of the apparatus, said vent means preventing said wastes from lodging in the threads between the barrel and the bushing.

7. Apparatus according to claim 6 further comprising vent means in said barrel for relieving pressures in the barrel to permit rapid return of the plunger to an initial position.

8. Apparatus having multiple propulsion charges and of the type in which a plunger is driven when the apparatus is fired comprising, a breech, a barrel having a cartridge chamber, a magazine connected to the breech for feeding cartridges into the cartridge chamber, means for locking the barrel to the breech for firing a cartridge in the chamber, means mounting said barrel on said breech for pivotal movement about a pivot axis parallel to and spaced from the axis of the barrel, from a first position in which the barrel is aligned with and can be locked to the breech, to a second position in which the barrel is aligned with the magazine to load a cartridge into the cartridge chamber, and comprising cartridge restraining means for preventing a cartridge from entering the cartridge chamber of the barrel in said second position of said barrel, said means being movable from a loading preventing position to prevent a cartridge from entering the chamber, to a loading position in which the cartridge can enter the chamber.

9. Apparatus according to claim 8 wherein said cartridge restraining means comprises a plate pivotally connected to said breech for movement between said positions.

10. Apparatus according to claim 9 further comprising a loading lever connected to said plate for moving said plate to said cartridge loading position, and spring means for moving said plate to said loading preventing position.

11. Apparatus according to claim 10 wherein said spring means comprises a spring having its opposite ends seated respectively on said breech and said lever.

12. Apparatus according to claim 11 wherein said loading preventing means comprises a plate having an opening, and formed from a rigid material, said plate being positioned between said carrier and said magazine, said opening in the plate being aligned with the barrel axis in said loading position.

13. Apparatus having multiple propulsion charges and of the type in which a plunger is driven when the apparatus is fired comprising, a breech, a barrel having a cartridge chamber, a magazine connected to the breech for feeding cartridges into the cartridge chamber, means for locking the barrel to the breech upon rotation of the barrel, for firing a cartridge in the chamber, a barrel carrier mounting said barrel on said breech for pivotal movement about a pivot axis parallel to and spaced from the axis of the barrel, from a first position in which the barrel is aligned with and can be locked to the breech, to a second position in which the barrel is aligned with the magazine to load a cartridge into the cartridge chamber, said barrel carrier having an opening therein for slidably receiving an enlarged intermediate portion of said barrel to permit moving the barrel axially for locking to the breech, spring means for urging the barrel toward a forward position away from the breech, said carrier having a threaded forward end, a retaining ring threaded onto the forward end of the barrel carrier, cooperating clutch means on said barrel and said carrier for connecting said barrel and carrier together against relative rotation, in said forward position of said barrel, so that said barrel can be pivoted to said first and second positions by a twisting force applied to the barrel, said cooperating clutch means comprising, a plurality of axially opening slots in a forward end of said enlarged portion of the barrel, at least one axially opening slot in said threaded forward end of the carrier, a clutch ring between said retaining ring and said forward end of the carrier, said clutch ring having a key extending axially into said slot in the forward end of the carrier, said key being of a radial thickness to project inwardly of the carrier and engage in one of the slots of the enlarged portion of the barrel upon movement of the barrel to the forward position in the carrier, said key and slot rotationally locking the barrel to the carrier without transmitting torque applied to the barrel to the threaded connection between the barrel carrier and the retaining ring.

14. Apparatus according to claim 13 wherein said pivot axis comprises a pin having a head, a shoulder of said carrier engaging said head, said pin having a shank positioned in an opening in the breech, said shank having a recess, and a key in said breech extending into said recess to lock said pin.

* * * * *